(12) United States Patent
Palmqvist

(10) Patent No.: US 9,644,756 B2
(45) Date of Patent: May 9, 2017

(54) PRESSURE RELIEF VALVE

(71) Applicant: Pres-Vac Engineering ApS, Allerød (DK)

(72) Inventor: Ronni Palmqvist, Copenhagen Ø (DK)

(73) Assignee: PRES-VAC ENGINEERING APS, Allerød (DK)

( * ) Notice: Subject to any disclaimer, the term of this patent is extended or adjusted under 35 U.S.C. 154(b) by 318 days.

(21) Appl. No.: 14/362,342

(22) PCT Filed: Dec. 10, 2012

(86) PCT No.: PCT/EP2012/074933
§ 371 (c)(1),
(2) Date: Jun. 2, 2014

(87) PCT Pub. No.: WO2013/083832
PCT Pub. Date: Jun. 13, 2013

(65) Prior Publication Data
US 2014/0305520 A1    Oct. 16, 2014

Related U.S. Application Data

(60) Provisional application No. 61/568,848, filed on Dec. 9, 2011.

(30) Foreign Application Priority Data

Dec. 9, 2011 (DK) .................................. 2011 70694

(51) Int. Cl.
*F16K 17/12* (2006.01)
*F16K 31/08* (2006.01)
(Continued)

(52) U.S. Cl.
CPC .............. *F16K 17/12* (2013.01); *B65D 90/32* (2013.01); *B65D 90/34* (2013.01); *F16K 24/04* (2013.01);
(Continued)

(58) Field of Classification Search
CPC . F16K 17/12; Y10T 137/774; Y10T 137/7738
(Continued)

(56) References Cited

U.S. PATENT DOCUMENTS 3,999,571 A   12/1976  Pedersen et al.
4,243,064 A   1/1981   Nolte
(Continued)

FOREIGN PATENT DOCUMENTS

CN         1878977 A    12/2006
CN       200943741 Y     9/2007
(Continued)

OTHER PUBLICATIONS

Search Report received for Denmark Patent Application No. P201170694, mailed on Jul. 16, 2012, 1 page (Official Copy Only).
(Continued)

*Primary Examiner* — Craig Schneider
*Assistant Examiner* — Nicole Wentlandt
(74) *Attorney, Agent, or Firm* — Morrison & Foerster LLP

(57) ABSTRACT

A pressure relief valve for pressure equalization between an essentially closed space and the surrounding atmosphere is disclosed. The pressure relief valve includes a valve housing with:
  a cylindrical wall defining a flow passage,
  a valve body arranged to cooperate with a valve seat arranged in the outflow of the valve housing,
  a stem configured for axial guidance of the valve body,
  a lifting element or plate arranged further down in the flow passage relative to the valve seat,
  a flow constriction defining an essentially truncated conically shaped interior and arranged to encircle the lifting element such that a radial passage between the lifting element and flow constriction increase when the lifting
  (Continued)

element and the valve body is moved from a closed state of the pressure relief valve towards an open state of the pressure relief valve.

14 Claims, 3 Drawing Sheets

(51) Int. Cl.
*F16K 24/04* (2006.01)
*B65D 90/32* (2006.01)
*B65D 90/34* (2006.01)

(52) U.S. Cl.
CPC ......... *F16K 31/084* (2013.01); *Y10T 137/774* (2015.04)

(58) Field of Classification Search
USPC .................................................. 137/469, 471
See application file for complete search history.

(56) References Cited

U.S. PATENT DOCUMENTS

| | | | |
|---|---|---|---|
| 5,060,688 A | 10/1991 | Sorensen | |
| 5,094,266 A | 3/1992 | Ledbetter | |
| 5,172,716 A | 12/1992 | Paptzun | |
| 5,607,001 A | 3/1997 | Petersen | |
| 5,873,384 A | 2/1999 | Pedersen et al. | |
| 7,207,350 B2 * | 4/2007 | Sorensen | F16K 17/02 137/471 |
| 2003/0010385 A1 | 1/2003 | Il | |
| 2004/0065385 A1 | 4/2004 | Sorensen | |
| 2004/0177883 A1 | 9/2004 | Sorensen et al. | |
| 2006/0196476 A1 | 9/2006 | Stockner | |

FOREIGN PATENT DOCUMENTS

| | | |
|---|---|---|
| CN | 101128691 A | 2/2008 |
| CN | 201166174 Y | 12/2008 |
| DE | 29700833 U1 | 5/1997 |
| EP | 1154179 A2 | 11/2001 |
| FR | 1569858 A | 6/1969 |
| JP | 57-89086 U | 6/1982 |
| JP | 59-93579 A | 5/1984 |
| JP | 2836953 B2 | 12/1998 |
| JP | 2009-236148 A | 10/2009 |
| WO | 96/01962 A1 | 1/1996 |
| WO | 96/35898 A1 | 11/1996 |
| WO | 98/57082 A1 | 12/1998 |
| WO | 00/75543 A1 | 12/2000 |
| WO | 2005/038325 A1 | 4/2005 |
| WO | 2009/039857 A1 | 4/2009 |
| WO | 2011/032561 A2 | 3/2011 |
| WO | 2013/083832 A1 | 6/2013 |

OTHER PUBLICATIONS

International Preliminary Report on Patentability received for PCT Patent Application No. PCT/EP2012/074933, mailed on Nov. 18, 2013, 6 pages.
International Search Report received for PCT Patent Application No. PCT/EP2012/074933, mailed on Feb. 11, 2013, 5 pages.
Office Action received for Chinese Patent Application No. 201280060031.5, mailed on Apr. 15, 2015, 6 pages (English Translation Only).
Office Action received for Japanese Patent Application No. 2014-545304, mailed on Aug. 22, 2016, 5 pages (1 page of English Translation and 4 pages Official Copy Only).

* cited by examiner

PRESSURE RELIEF VALVE

CROSS-REFERENCE TO RELATED APPLICATIONS

This application is a national phase filing under 35 U.S.C. §371 of International Application No. PCT/EP2012/074933, filed on Dec. 10, 2012, which claims priority to Danish Patent Application No. PA 2011 70694, filed on Dec. 9, 2011, and U.S. Provisional Patent Application No. 61/568, 848, filed Dec. 9, 2011, the contents of which prior applications are incorporated herein by reference.

The present invention relates to a pressure relief valve for equalising pressure differences between a closed container, or a tank, and the surrounding atmosphere. In particular, the invention relates to a pressure relief valve for use in connection with a cargo hold such as a tank in a maritime carrier and the like.

The invention may, however, also lend itself for use in connection with stationary tanks or tanks supported by wheels and the like.

According to a first aspect, the present invention relates to a pressure relief valve for pressure equalization between an essentially closed space and the surrounding atmosphere. The pressure relief valve includes a valve housing including:
- a cylindrical pipe section defining a wall and a flow passage through the valve.
- an upwardly oriented outflow,
- a valve seat arranged in the outflow,
- a valve body arranged to cooperate with the valve seat. The valve body has a drop shaped outer surface suitable for collecting gas flowing through the outflow and around the valve body to form an upwardly oriented jet. The valve body further includes a downwardly oriented valve face configured for abutting the valve seat arranged in the outflow in order to define a closed state of the pressure relief valve,
- a stem configured for axial guidance of the valve body,
- a lifting element or disc arranged further down in the flow passage, relative to the valve seat, and within the cylindrical pipe section.

The lifting element is connected to the valve body via the stem in order to allow the lifting element and the valve body to be moved axially as one unit between a closed state of the pressure relief valve and a state in which the pressure relief valve is open. The pressure relief valve is configured such that the essentially closed space, i.e. the tank, is, at any time, in communication with the area above the lifting element.

BACKGROUND

When a tank or other closed space to be ventilated by pressure relief valves of the kind according to the present invention is loaded with a given volume of liquid per time unit, the pressure relief valves open when the gas pressure within the tank reaches a predefined opening pressure and, upon opening of the pressure relief valve, a volume of gas per time unit which corresponds to the product volume loaded per time unit plus any evaporation from the liquid surface in the tank is then to be blown out, hence the designation "pressure relief valve".

The blown-out volume per time unit depends primarily on the flow resistance of the valve and on the pressure prevailing within the tank. The maximum blown-out volume per time unit minus any evaporation, which may occur without the pressure within the tank exceeding a given safety threshold value, Pmax, is the designated capacity of the pressure relief valve.

The capacity of the pressure relief valve determines the maximally allowable loaded volume per time unit. When, upon interruption of the loading, the pressure within the tank drops to, or below, a certain value, i.e. to or below the closing pressure of the pressure relief valve, the pressure relief valve close.

The closing pressure of the pressure relief valve typically is lower than the opening pressure of the pressure relief valve.

Most prior art pressure relief valves are configured such that the closing pressure of the valves is considerably lower than the opening pressure of the valves. By this, most prior art pressure relief valves ventilate any boiling off or evaporation from products like petroleum products or chemicals in fundamentally the same manner as the valves ventilate during loading of the cargo space. This is considered undesirable as most prior art pressure relief valves cannot maintain a relatively constant excess pressure in a cargo space to be ventilated. In fact, most prior art pressure relief valves subject the space to be ventilated to large pressure fluctuations. The large pressure fluctuations cause wasteful and unnecessary escape of often harmful gas.

Another use of pressure relief valves applies when, for safety reasons, it is required to supply an inert gas, such as nitrogen, to the free ullage of a container above the product being transported. For instance, the product may be an inflammable liquid or a material, such as oranges and lemons that gives off inflammable gasses, following storage. The inert gas is automatically kept at a predetermined pressure that may be configured to lie above the atmospheric pressure, but below the opening pressure of the pressure valve. In this case any rise or a drop in the temperature of the surroundings will give rise to a corresponding change in the pressure of the inert gas within the container, whereby the pressure valve must open.

In prior art pressure relief valves, it has been found that the difference between the opening pressure of the valves and the closing pressure of the valves, due to the design of the pressure valves, is too large for the pressure valves to be optimally suited for use in the transport of certain materials. This has been found to be particularly problematic in large capacity pressure relief valves.

U.S. Pat. No. 5,060,688 A discloses a pressure relief valve for pressure equalization between a closed space and the surrounding atmosphere. The valve includes a valve housing with an upwardly facing blow-off opening. A drop-shaped valve body is arranged in the blow-off opening. The valve body is connected to a lifting disc which has a larger area than the valve seat and the lifting disc is surrounded by a free passage slot defined by the lifting disc and the wall of the valve housing. According to the reference, advantageous opening and closing characteristics can be obtained as the free area of said free passage slot increase when the valve opens. The increase in free passage of the slot is obtained by complex geometries of the moulded wall defining the flow passage of the pressure relief valve.

US 2004/0177883 A discloses a pressure relief valve. The valve includes a valve body and a lifting plate that has a surface area A2 oriented transversally of the flow passage that exceeds the cross sectional area A1 of the flow passage at the valve seat. The pressure relief valve is configured such that, at any time, the container to be ventilated is in communication with the area above the lifting plate. According to the reference, a magnet and a magnetisable body contributes to defining an abutment force Fc, of the valve body against the valve seat in the closed state of the pressure valve. By this, an increased opening pressure of the pressure relief valve is obtained.

U.S. Pat. No. 5,873,384 A discloses pressure relief valve including a valve housing and a drop-shaped valve body with a conical valve surface configured to cooperate with a conical valve seat at an upwardly directed blow-off opening of the valve housing. The drop-shaped body is connected to a lifting disc in the housing. The inner configuration of the housing provides an annular passage around the lifting disc which is smaller in area when the lifting disc and the drop-shaped body is in its uppermost, fully open positioning as compared to its lowermost, closed positioning.

The above references are incorporated herein in their entirety.

The present invention seeks to provide an easy to produce pressure relief valve of the kind described above, wherein the difference between the opening pressure and the closing pressure can be maintained at a minimum even for large capacity pressure relief valves. In particular, it is an object of the present invention to set forth an easy to produce pressure relief valve configured to avoid abrupt closure of the valve as a result of reduced pressure in the space to be ventilated.

This is obtained by the pressure relief valve according to the present invention and as described in the appended claims.

By the embodiments featured in the dependent claims, a particularly convenient configuration of the characteristic curve of the pressure valve during the course of the closing the pressure relief valve is obtained.

BRIEF DESCRIPTION OF THE INVENTION

It is an object of the present invention to set forth a relatively cheap and easy to produce pressure relief valve configured for closing smoothly at a pressure close to the opening pressure of the valve.

In particular, it is an object of the present invention to set forth a high capacity pressure relief valve, preferably made of commonly available standard components, where the valve is configured for closing smoothly at a pressure close to the opening pressure of the pressure relief valve.

According to the present invention, the above objects are met by the provision of a pressure relief valve as per the introductory part of this specification wherein the cylindrical pipe section further includes a flow constriction defining an essentially truncated conically shaped interior of the flow constriction.

The flow constriction is configured and arranged to encircle the lifting element when the pressure relief valve is closed such that a radial passage, or clearance, between the lifting element and the flow constriction increase when the lifting element and the valve body is moved from a closed state of the pressure relief valve towards an open state of the pressure relief valve.

The provision of the flow constriction to a cylindrical pipe section as per an aspect of the present invention greatly reduces production costs as the valve housing may be constructed from cheap and widely available standard components. Prior art pressure relief valves comprising complex geometries configured for controlling airflow past, or around, the lifting element are produced in costly and complex production processes such as moulding and subsequent machining etc.

The effect of varying the radial width of the ring-shaped opening defined by the flow constriction and the lifting element is, due to reduced pressure on the valve side of the lifting element as a consequence of the lifting element moving downwards, that the pressure relief valve is kept open even at low rates of flow whereby precise valve actuation is obtained.

According to one embodiment, the flow constriction may be provided to the cylindrical pipe section defining the wall of the valve housing as ring, machined or not, having an outer diameter corresponding to an inner diameter of said cylindrical pipe section.

According to one embodiment, the flow constriction may be connected to the cylindrical pipe section by means press fitting, mechanical fastening means such as screws or rivets or by means of welding.

According to one embodiment, in a closed state of the pressure relief valve, the radial passage between the lifting element and the flow constriction, or venturi, may be minimum 12% of the internal diameter of the flow constriction.

According to one embodiment, in a closed state of the pressure relief valve, the radial passage between the lifting element and the flow constriction may be in the range of 15-25% or 12-24% or 18-22% of an internal diameter of the flow constriction.

According to one embodiment, in a closed state of the pressure relief valve, the radial passage between the lifting element and the flow constriction may be in the range of 21-23% of an internal diameter of the flow constriction.

According to one embodiment, the height of the truncated conically shaped interior part of the flow constriction may be in the range of 10-20% of the diameter of the flow passage, the height may equate essentially to the length of the stroke of the pressure relief valve.

According to one embodiment, the truncated conically shaped interior part of the flow constriction may define an angle with respect to the orientation of the valve housing which is within the range of 5°-85°, alternatively within the range of 10°-40° or 10°-30° or 10°-20°.

According to one embodiment, the truncated conically shaped interior part of the flow constriction may define an angle selected as to prevent the pressure relief valve from instantly closing as a result of flow reduction through the pressure relief valve.

According to one embodiment, the lifting element may be disc shaped.

According to one embodiment, the lifting element may be disc shaped and may or may not have an outer diameter that exceeds the internal diameter of the valve seat.

According to one embodiment, the mass of the lifting element may contribute in defining the abutment force Fc of the valve body against the valve seat in a closed state of the pressure relief valve.

According to one embodiment, the lifting element may have a surface area A2 transversally to the flow passage that exceeds the area of a gap defined in between the valve body and the valve seat when the pressure relief valve is open.

According to one embodiment, the pressure relief valve further may include a magnet and a magnetisable body configured and arranged such that a force of attraction Fm between the magnet and the magnetisable body contribute in defining the abutment force Fc of the valve body against the valve seat in a closed state of the pressure relief valve.

According to one embodiment, the magnet may be fixedly mounted interiorly of the valve housing above the lifting element. Further, the distance between the magnet and the magnetisable body may be varied, e.g. by means of an adjusting screw.

According to one embodiment, the magnetisable body may be fixedly mounted interiorly of the valve housing above the lifting element. Further, the distance between the magnet and the magnetisable body may be varied, e.g. by means of an adjusting screw.

According to one embodiment, the valve body may be essentially drop-shaped.

According to another aspect of the present invention, a pressure relief valve for pressure equalization between an essentially closed space and the surrounding atmosphere is disclosed. The pressure relief valve includes a valve housing with:
- a wall defining a flow passage with an upwardly oriented outflow (51). The wall is, opposite the outflow, connectable to a space, such as a tank, to be ventilated,
- a valve seat arranged in the outflow,
- a valve body arranged to cooperate with the valve seat. The valve body may have an outer surface suitable for collecting a gas flow that flows through the outflow passage and around the valve body to form an upwardly oriented jet. The valve body may further include a downwardly oriented valve face configured for abutting the valve seat in the outflow mouthing of the valve housing in order to define a closed state of pressure relief valve,
- a stem configured for axial guidance of valve body,
- a lifting element arranged further down in the flow passage, relative to the valve seat, The lifting element is connected to the valve body via the stem in order to allow the lifting element and the valve body to be moved axially as one unit between a closed state of the pressure relief valve and a state in which the pressure relief valve is open.

The pressure relief valve according to this other aspect further is configured such that the essentially closed space, or tank, is, at any time, in communication with the area above the lifting element. The valve housing further includes a flow constriction, or venturi, defining an essentially truncated conically shaped interior. The flow constriction is arranged to encircle the lifting element when the valve is closed, such that a radial passage, or clearance, in the range of 10-25% or 15-25% of an internal diameter of the flow constriction is provided between the lifting element and the flow constriction. The clearance increase when the lifting element and the valve body are moved from a closed state of the pressure relief valve towards an open state of the pressure relief valve.

DETAILED DESCRIPTION OF THE INVENTION WITH REFERENCE TO THE FIGURES

The invention will in the below be explained in further detail with reference to the arbitrary embodiment shown in the figures.

Figure 1:
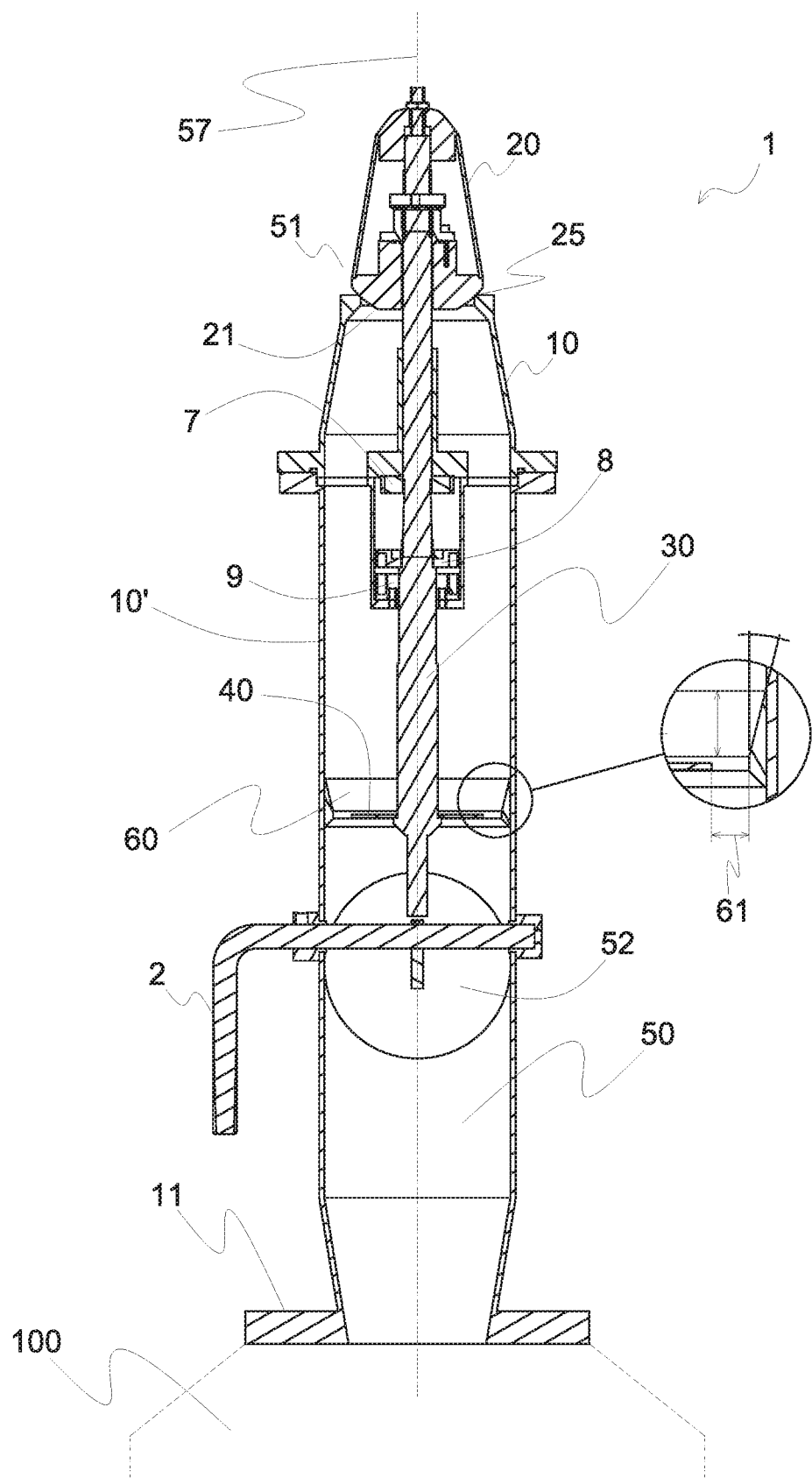
FIG. 1 illustrates a sectional view through a valve in its closed state and in accordance with an aspect of the present invention.

FIG. 1 illustrates, via reference numeral 10, a vertically oriented or upright, elongated valve housing having, at its bottom, a flange 11, by which the valve housing 10 may be bolted or otherwise fixed to a pressure release stub on a gas-filled container such as a tank or a cargo hold on a ship, or to the top end of a pressure relief tube that is connected to a space to be ventilated.

The pressure relief valve 1 has a tubular wall, which is part of the valve housing 10, that defines a through-going flow passage 50 with an outflow mouthing 51, whereby gas in a subjacent space 100 may escape to the free atmosphere under particular pressure conditions.

As can be seen, the central part of the wall 10' may, in accordance with an aspect of the present invention, be embodied as a cylindrical pipe section provided with a flange 11 for connection with a space 100 to be ventilated as well as a top section comprising or accommodating a valve seat 25 and means for guiding the stem 30 and thereto attached components.

The flow passage 50 at the top of the valve or valve housing 10 preferably may have a circular cross section, but other cross-sectional configurations may be selected, including e.g. a rectangular cross-section.

An optional lateral opening 52 may be provided in the tubular wall 10, to which a vacuum relief valve may be connected.

In the outflow mouthing 51, an annular valve seat 25 is mounted. The valve seat 25 is configured to cooperate with a valve face on the lower face 21 of the valve body 20. The valve body 20 is movably guided so as to be displaceable between the entirely open state (FIG. 2) of the pressure relief valve and the closed state of the pressure valve according to FIG. 1. Suitable stop elements may serve to limit or delimit the movement of the valve body 20.

In FIG. 1 the pressure relief valve is shown in the closed state where the valve face abuts closely on the valve seat 25. The valve seat 25 and the valve face may preferably have a conical shape, and the valve body 25 preferably may have a surface portion which is configured so as to allow a flow of gas flowing from the container upwards around the valve body 25 to be combined to an aggregate upwardly oriented jet of gas above the valve housing 10.

In addition to the closure provided by way of the valve body 20 abutting the valve seat 25, other and not shown means of sealing may be provided as an alternative or as a supplement. One example is the provision of an O-ring, arranged on the valve body 20 and/or on the valve housing 10 and/or the valve seat 25. The other means of sealing may be chosen such that closure may or may not be established in conjunction with the valve body 20 abutting the valve seat 25.

To the valve body 20, a stem 30, or rod-shaped connecting element 30, is, rigidly or not, attached. The rod-shaped connecting element 30 extends down through a part of the valve housing 10.

The connecting element 30 is conveyed in guides and is displaced along the flow passage 50 along the axis 57. On the connecting element 30, a lifting element or disc 40 is mounted.

Brake means 7 may be arranged as to dampen the upward and downward motion of the connecting element or stem 30. As vaguely illustrated in FIGS. 1 and 2, the brake means may include an annular rack provided with a suitable number, e.g. 3, of spring loaded balls or spheres interacting with a slightly conical portion of the connecting element 30.

A flow constrictor 60, or venturi, is arranged on the interior face of the valve housing 10. The flow constrictor 60 is arranged essentially in level with the lifting element 40 and also around the lifting element 40. The flow constrictor 60 together with the lifting element 40 define an annular gap 61 which in accordance with the present invention varies in width as a function of the height assumed be the lifting element 40. Upon comparison of the distances 61 in FIGS. 1 and 2, this is evident.

The flow constrictor 60, or venturi, may or may not form an integrated part of the valve housing 10. As an equal alternative, the flow constrictor 60, or venturi, may be provided as a component to be fixed inside the flow passage, e.g. by bolts, welding or press fitting etc. during assembly the pressure relief valve. Further, the flow constrictor 60, or venturi, may be retrofitted into present pressure relief valves.

According to any desired characteristics of the pressure relief valve, the lifting element 40 may be configured with an uninterrupted or closed surface whereby gas in the flow passage 50 may only flow around the lifting element 40 to the area above the lifting element 40 through the gap 61.

Figure 2:
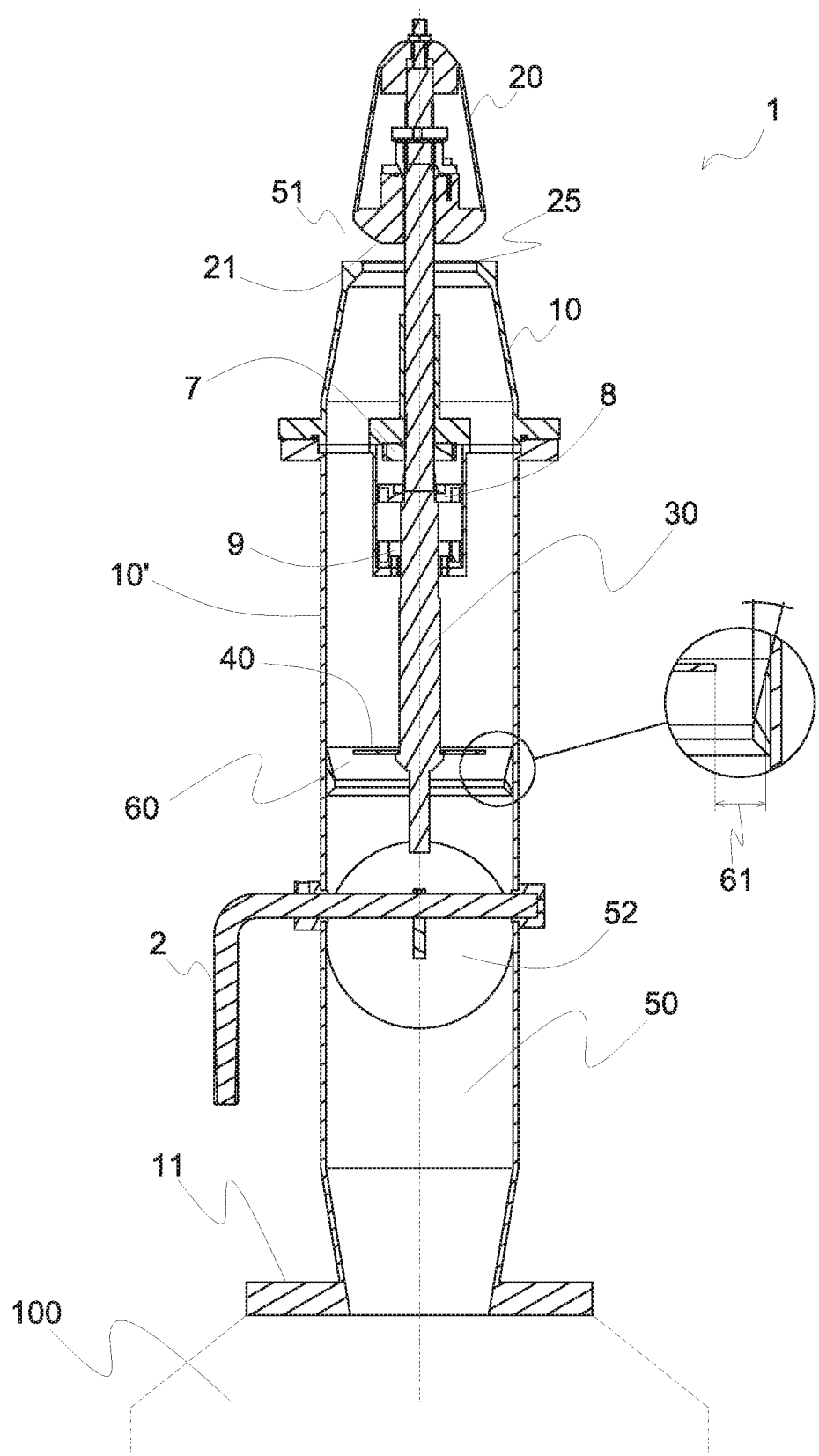
FIG. 2 illustrates a sectional view through a valve in an open state and in accordance with an aspect of the present invention.

As shown in FIGS. 1 and 2, the pressure relief valve also may include an actuator unit 2 for producing a control movement of the connecting element 30 and thus of the valve body 20. The actuator unit 2 can be operated from the exterior of the valve housing 10 by means of a handle.

In association with the connecting element 30, the pressure relief valve also may comprise a magnet 8 that may, as shown, be mounted in the flow passage 50 above the lifting element 40, and a magnetisable body 9 that is configured for being able to cooperate with the magnet 8 in the closed, or essentially closed, state of the pressure relief valve. The magnet 8 and the magnetisable body 9 may optionally be located in the area below the lifting element 40 which may be preferred when there is a need for achieving regular access to the magnet 8. The magnet 8 may be a permanent magnet or e.g. an electro-magnet, the magnetisable body 9 and the magnet 8 may replace one another.

In the closed position of the pressure relief valve, such as shown in FIG. 1, the valve body 20 influences the valve seat 25 by a downwardly oriented abutment force Fc that contains contributions from the mass of the valve body 20, the mass of the connecting element 30, the mass of any weight load, the mass of either the magnet 8 or the magnetisable body 9, depending on which of these parts is mounted on the connecting element 30, and from the force of attraction Fm between the magnet 8 and the magnetisable body 9.

The abutment force Fc is, as per the above, to be understood as the force that keeps the pressure relief valve closed, i.e. the closing force of the pressure valve. The abutment force Fc may be changed e.g. by varying the position relative to each other of the magnet 8 and the magnetisable body 9, a gap of a given size optionally being present in-between the elements in the closed position of the pressure valve.

When, in the space to be ventilated, the pressure rises above atmospheric pressure such pressure will, due to the gap 61, also reign in the space between the lifting element 40 and the valve body 20. The pressure in this space is thereby equal to the pressure within the space to be ventilated, and the pressure influences the top face and lower face of the lifting element 40 by the same force.

As long as the superatmospheric pressure does not give rise to an upwardly oriented force on the valve body 20 that exceeds the closing force Fc of the pressure relief valve, the pressure relief valve will remain in the closed state. The upwardly oriented force on the valve body 20 can be determined as the superatmospheric pressure in the container multiplied by the area Ai of the mouthing 51 of the flow passage 50.

When the superatmospheric pressure exceeds the closing force Fc of the pressure relief valve, the pressure relief valve opens. The outflow of gas causes the pressure on the face of the lifting element 40 that faces towards the mouthing to drop. The upwardly oriented movement of the valve body 20 towards the entirely open position of the pressure relief valve is then controlled to a certain extent by the force exerted by the flowing gas on the lower face of the lifting element 40. This influence can be determined as the superatmospheric pressure of the space to be ventilated multiplied by the area A2 of the lifting element 40. Since this area exceeds the area Ai of the outflow mouthing 51, the lifting force of the gas on the lifting element 40 increases, and the rate of movement of the lifting element 40 and hence of the valve body 20 in a direction towards the entirely open state of the pressure relief valve increases.

In FIG. 2 the pressure relief valve is shown in its open state wherein the valve body 20 is kept in its open position by the flowing gas. The downwardly oriented force on the valve body 20 contains contributions from the mass of the valve body 20, the mass of the connecting element 30, the mass of any weight load, the mass of either the magnet 8 or the magnetisable body 9, depending on which of the two parts is mounted on the connecting element 30. The force of attraction Fm between the magnet 8 and the magnetisable body 9 does not significantly contribute as soon as the valve body 20 has moved slightly away from the position shown in FIG. 1.

The gas flowing past the lifting element 40 creates a negative pressure on the face of the lifting element 40 facing the outflow of the pressure relief valve. By this, lifting force is applied to the lifting element 40 and stem etc.

In the shown open position according to FIG. 2, the pressure relief valve allows outflow of a given volume of gas per time unit as a function of the pressure within the space to be ventilated. This amount depends on the dimensions of the pressure relief valve and is selected in accordance with the size and characteristics of the space to ventilated, whereby it is ensured that gas contained in the space is allowed to flow out before the superatmospheric pressure exceeds a critical value for the space or container.

It is noted that the valve body 20 may be configured with a downwardly open hollow cavity that contributes, to a small extent, to keeping the pressure relief valve in its open position. Furthermore, according to one embodiment the pressure valve can be provided with a number of further superjacent lifting elements with, possibly with decreasing surface areas A2.

Figure 3:
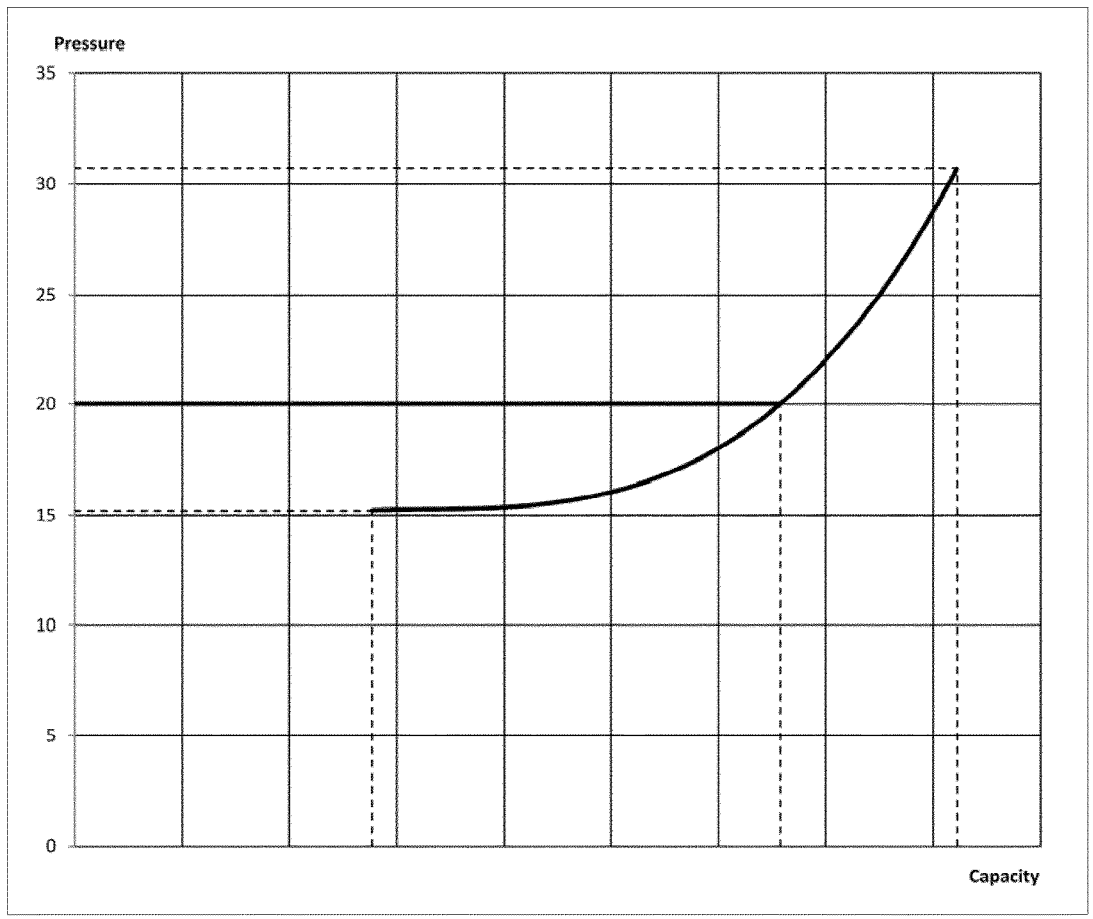
FIG. 3 shows a characteristic curve of a valve according to the present invention.

FIG. 3 shows the characteristic curve of a pressure relief valve according to the present invention. The curve show the opening and closing course of the valve.

The curve according to FIG. 3 is drawn up under ISO 15364:2007(E).

It will appear from FIG. 3 that the difference between the opening pressure and the closing pressure is greatly reduced compared with prior art pressure relief valves.

In other words, by the invention it is ensured that the pressure relief valve will close controllably when the pressure within the space to be ventilated 100, or container, has dropped by a relatively small value.

The application and combination of features and solutions presented by the present invention is not limited to the presented embodiments. One or more features of one embodiment can and may be combined with one or more features of other embodiments, whereby not described but valid, embodiments of the present invention may be obtained.

The term "comprises/comprising/comprised of" when used in this specification incl. claims is taken to specify the presence of stated features, integers, steps or components but does not preclude the presence or addition of one or more other features, integers, steps, components or groups thereof.

The invention claimed is:

1. A pressure relief valve for pressure equalization between an essentially closed space and surrounding atmosphere, said pressure relief valve includes a valve housing comprising:
   a cylindrical pipe section defining a wall and a flow passage,
   an upwardly oriented outflow,
   a valve seat arranged in said outflow,
   a valve body arranged to cooperate with said valve seat, said valve body having a drop shaped outer surface suitable for collecting gas flowing through said outflow and around said valve body to form an upwardly oriented jet, said valve body further including a downwardly oriented valve face configured for abutting said valve seat arranged in said outflow in order to define a closed state of said pressure relief valve,
   a stem configured for axial guidance of said valve body, and
   a lifting element arranged in said flow passage between said valve seat and the essentially closed space,
   wherein said lifting element is connected to said valve body via said stem in order to allow said lifting element and said valve body to be moved axially as one unit between the closed state of said pressure relief valve and a state in which said pressure relief valve is open, and said pressure relief valve is configured such that the essentially closed space is, at any time, in communication with the area between said lifting element and the valve seat,
   wherein said cylindrical pipe section further includes a flow constriction defining an essentially truncated conically shaped interior of said flow constriction, said flow constriction is configured and arranged to encircle said lifting element when said pressure relief valve is closed such that a radial passage between said lifting element and said flow constriction increase when said lifting element and said valve body is moved from the closed state of said pressure relief valve towards an open state of said pressure relief valve, said flow constriction is a separate ring inserted in said cylindrical pipe section to define said wall of said valve housing, and the ring has an outer diameter corresponding to an inner diameter of said cylindrical pipe section.

2. The pressure relief valve according to claim 1, wherein said flow constriction is connected to said cylindrical pipe section by means of mechanical fastening means or welding.

3. The pressure relief valve according to claim 1, wherein, in the closed state of said pressure relief valve, said radial passage between said lifting element and said flow constriction is minimum 12% of the internal diameter of said flow constriction.

4. The pressure relief valve according to claim 1, wherein, in the closed state of said pressure relief valve, said radial passage between said lifting element and said flow constriction is in the range of 15-25% of an internal diameter of said flow constriction.

5. The pressure relief valve according to claim 1, wherein, in the closed state of said pressure relief valve, said radial passage between said lifting element and said flow constriction is in the range of 21-23% of an internal diameter of said flow constriction.

6. The pressure relief valve according to claim 1, wherein the height of said truncated conically shaped interior part of said flow constriction is in the range of 10-20% of the diameter of said flow passage.

7. The pressure relief valve according to claim 1, wherein said truncated conically shaped interior part of said flow constriction define an angle measured from the orientation of said valve housing which is within the range of 10°-40°.

8. The pressure relief valve according to claim 1, wherein said lifting element is disc shaped.

9. The pressure relief valve according to claim 1, wherein said lifting element is disc shaped and has an outer diameter that exceeds the internal diameter of said valve seat.

10. The pressure relief valve according to claim 1, wherein said mass of said lifting element contribute in defining an abutment force of said valve body against said valve seat in the closed state of said pressure relief valve.

11. The pressure relief valve according to claim 1, wherein said lifting element has a surface area transverse to said flow passage that exceeds the area of a gap defined in between said valve body and said valve seat when said pressure relief valve is open.

12. The pressure relief valve according to claim 1, wherein said pressure relief valve further includes a magnet and a magnetisable body configured and arranged such that a force of attraction Fm between said magnet and said magnetisable body contribute in defining an abutment force of said valve body against said valve seat in the closed state of said pressure relief valve.

13. The pressure relief valve according to claim 12, wherein said magnet is fixedly mounted interiorly of the valve housing between said lifting element and the valve seat, and wherein the distance between said magnet and said magnetisable body can be varied.

14. The pressure relief valve according to claim 12, wherein said magnetisable body is fixedly mounted interiorly of the valve housing above said lifting element and wherein the distance between said magnet and said magnetisable body can be varied.

* * * * *